Patented Nov. 24, 1925.

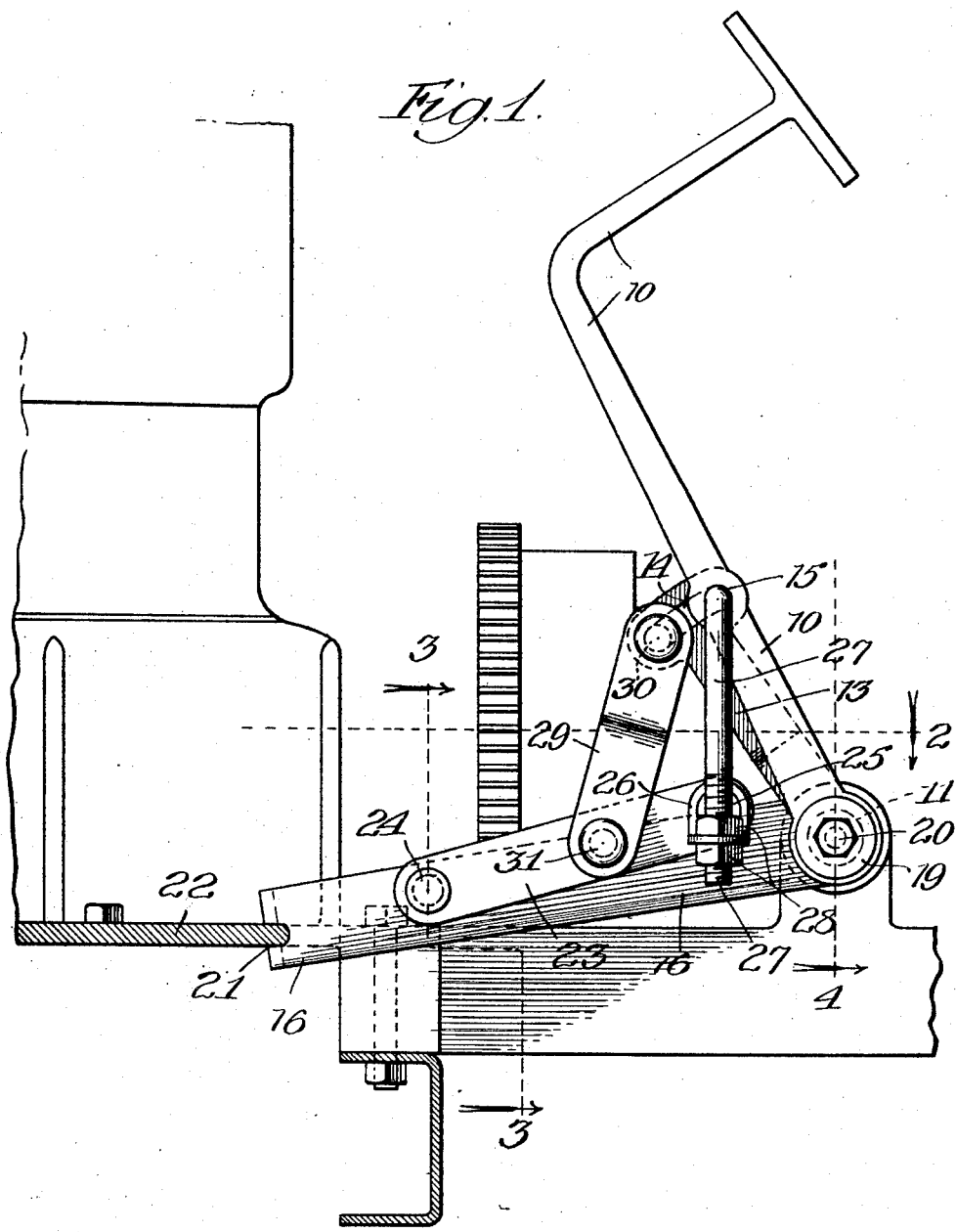

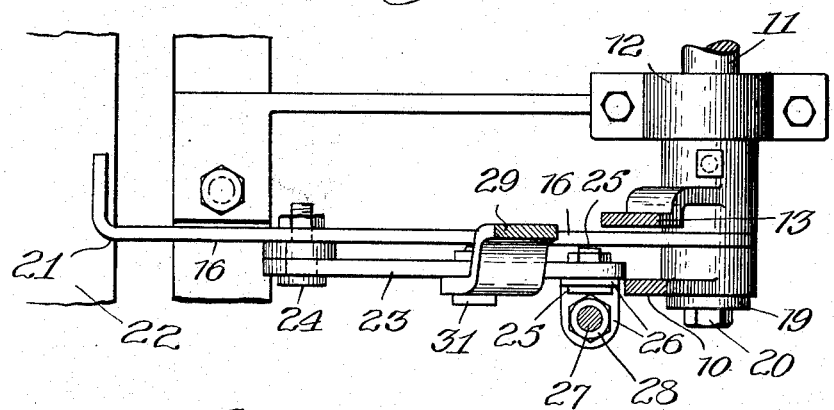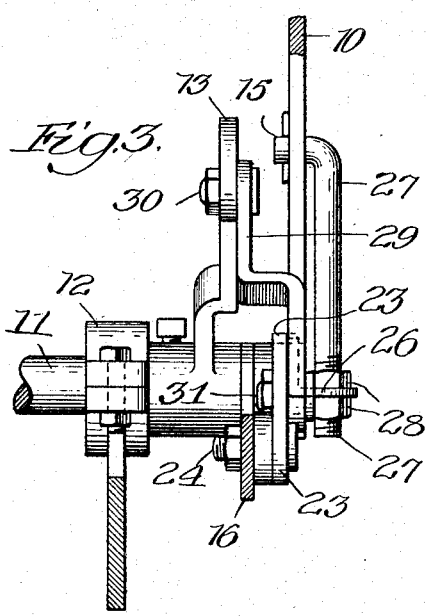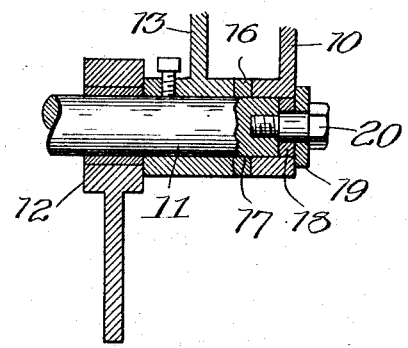

1,563,035

UNITED STATES PATENT OFFICE.

JOSEPH S. LOSEE, OF HEBRON, ILLINOIS.

CLUTCH-OPERATING MECHANISM.

Application filed June 22, 1925. Serial No. 38,750.

*To all whom it may concern:*

Be it known that I, JOSEPH S. LOSEE, a citizen of the United States, residing at Hebron, in the county of McHenry and State of Illinois, have invented a new and useful Improvement in Clutch-Operating Mechanism, of which the following is a specification.

This invention relates to clutch operating mechanism for use on automobiles and the like.

In some automobiles particularly those of the cone clutch type a very slight movement of the cone to release suddenly when the cone is moved outwardly and to "grab" when the cone is moved inwardly. Thus the operator, unless he is very skillful and careful in manipulating his clutch, will operate his car in a very jerky fashion, particularly on starting.

The primary object of this invention is to overcome this difficulty and to provide means for easily and smoothly engaging and disengaging the clutch.

Another object is to provide a device of this character which is very simple and economical to build and at the same time is easily installed.

These and other objects, as will hereinafter appear, are accomplished by this invention which is fully described in the following specification and shown in the accompanying lines; in which Figure 1 is a side elevation of the clutch operating mechanism showing it in relation to its associated parts;

Fig. 2 is a partial horizontal section on the line 2 of Fig. 1;

Fig. 3 is a vertical section on the line 3—3 of Fig. 1; and

Fig. 4 is a partial section on the line 4 of Fig. 1.

The device as illustrated is shown in connection with an automobile having a clutch pedal 10 journalled upon a shaft 11 which is carried in a suitable bearing 12 and operably connected by means not shown with the clutch-throwout mechanism.

A lever 13 is keyed or otherwise secured to the shaft 11 and has an arcuate slot 14 in its outer end which is adapted to register with an opening 15 in the clutch pedal 10 so that a bolt (not shown) may be passed through the slot 14 and opening 15 to secure the clutch pedal and lever together, the elongated arcuate slot 14 permitting adjustment of the pedal 10 with respect to the lever 13.

In applying the present device however, the bolt (not shown) is removed connecting the lever and clutch pedal, the latter is removed from the shaft 11 and a stationary member 16 having an opening 17 is fitted over the shaft 11 after which the clutch pedal 10 is replaced and a washer 18 substantially the thickness of the member 16 is placed at the end of the shaft 11. This is held in place by means of a washer 19 and a shoulder screw 20, the thickness of the washer being sufficient to prevent pressure between the clutch pedal 10 and the washer 19.

The outer end of the stationary member 16 is bent at right angles to the body of the member and has a slot 21 therein which is adapted to fit over a rib 22 on the side of the engine. Any other convenient means could be used for supporting the outer end of the stationary member 16 which it will be observed is nearly horizontal.

An arm 23 is hingedly connected at one end at 24 to the stationary member 16 and the opposite end, which is near the shaft 11, is hingedly connected by means of the rivet 25 to a lug 26 through which passes a rod 27 which is threaded at its lower end and adjustably secured to the lug 26 by means of locking nuts 28. The upper end of the rod 27 is bent at an angle so as to pass through the opening 15 in the clutch pedal 10.

A link 29 is hingedly mounted at its upper end by means of a pin 30 to the outer end of the lever 13 and, its lower end by means of a pin 31 to the arm 23 at a point intermediate the previously mentioned hinge points 24 and 25 of the arm 23.

The operation of this device is as follows:

As the operator depresses the clutch pedal 10 the rod 27 forces the arm 23 downwardly thereby acting through the link 29 to rotate the lever 13 in the same general direction as the clutch pedal 10 is moved. Owing however to the differences in the effective lever arms thus produced among the several parts of the mechanism the lever 13 is moved through a very much smaller angle than the clutch pedal 10. Thus for a required movement of the lever 10 to release the clutch to which it is operably attached, the clutch pedal 10 will necessarily have to be moved much further than would be the case were it fastened directly to the lever 13 and consequently the operator can operate the clutch with a much easier and smoother motion.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a clutch operating mechanism, a clutch operating shaft, a lever secured to said shaft, a clutch pedal journalled on said shaft, a stationary member, an arm hingedly connected thereto at one end, a rod hingedly connecting the opposite end of said arm and said clutch pedal, and a link hingedly connecting the end of said lever and a point on said arm intermediate its previously mentioned hinge points.

2. In a clutch operating mechanism, a clutch operating shaft, a lever secured to said shaft, a clutch pedal journalled on said shaft, a stationary member, an arm hingedly connected thereto at one end, a rod hingedly connecting the opposite end of said arm and said clutch pedal, and a link hingedly connecting the end of said lever and a point on said arm intermediate its previously mentioned hinge points, said lever and pedal being set at substantially the same angle.

3. In a clutch operating mechanism, a clutch operating shaft, a lever secured to said shaft, a clutch pedal journalled on said shaft, a stationary member, an arm hingedly connected thereto at one end, a rod hingedly connecting the opposite end of said arm and said clutch pedal, and a link hingedly connecting the end of said lever and a point on said arm substantially midway between its previously mentioned hinge points.

4. In a clutch operating mechanism, a clutch operating shaft, a lever secured to said shaft, a clutch pedal journalled on said shaft, a stationary member journalled at one end on said shaft, the other end being secured to a point forward of said shaft, an arm hingedly connected thereto at one end, a rod hingedly connecting the opposite end of said arm and said clutch pedal, and a link hingedly connecting the end of said lever and a point on said arm intermediate its previously mentioned hinge points.

5. In a clutch operating mechanism, a clutch operating shaft, a lever secured to said shaft, a clutch pedal journalled on said shaft, a stationary member, an arm hingedly connected thereto at one end, a rod hingedly connecting the opposite end of said arm and said clutch pedal, and a link hingedly connecting the end of said lever and a point on said arm intermediate its previously mentioned hinge points, said rod and link converging upwardly.

JOSEPH S. LOSEE.